(12) United States Patent
Harley et al.

(10) Patent No.: US 9,340,239 B2
(45) Date of Patent: May 17, 2016

(54) PASSENGER SERVICE VEHICLE

(71) Applicant: Alexander Dennis Limited, Camelon Falkirk (GB)

(72) Inventors: Tom Harley, Camelon Falkirk (GB); Paul Donnachie, Camelon Falkirk (GB)

(73) Assignee: Alexander Dennis Limited, Falkirk (GB)

( * ) Notice: Subject to any disclaimer, the term of this patent is extended or adjusted under 35 U.S.C. 154(b) by 0 days.

(21) Appl. No.: 14/399,733

(22) PCT Filed: May 8, 2013

(86) PCT No.: PCT/GB2013/051196
§ 371 (c)(1),
(2) Date: Nov. 7, 2014

(87) PCT Pub. No.: WO2013/167893
PCT Pub. Date: Nov. 14, 2013

(65) Prior Publication Data
US 2015/0137500 A1 May 21, 2015

(30) Foreign Application Priority Data
May 8, 2012 (GB) .................................. 1208014.9

(51) Int. Cl.
*B62D 31/04* (2006.01)
*B60K 15/063* (2006.01)

(52) U.S. Cl.
CPC .............. *B62D 31/04* (2013.01); *B60K 15/063* (2013.01)

(58) Field of Classification Search
CPC ........ B62D 31/04; B62D 47/02; B60N 2/242; B60N 3/02; B60N 2/00; B60N 2/3097; B60P 1/6418; B60P 7/132; B60P 3/0252; B60P 3/14
USPC ............... 296/178, 203.01, 210, 191, 146.16, 296/193.01, 64, 84; 280/6.152, 788, 781, 280/834, 124.11; 180/287, 297, 311, 314, 180/358; 414/921, 545
See application file for complete search history.

(56) References Cited

U.S. PATENT DOCUMENTS

| | | | | |
|---|---|---|---|---|
| 1,710,616 A | * | 4/1929 | Guernsey | 296/178 |
| 1,905,842 A | * | 4/1933 | Forrester | 296/178 |
| 2,563,917 A | * | 8/1951 | Caesar et al. | 296/178 |
| 3,029,102 A | | 4/1962 | Mueller | |

(Continued)

FOREIGN PATENT DOCUMENTS

| | | |
|---|---|---|
| CN | 201587461 | 12/2010 |
| ES | 2367078 A1 | 10/2011 |

(Continued)

OTHER PUBLICATIONS

International Search Report and Written Opinion dated Jul. 19, 2013, International Application No. PCT/GB2013/051196.

*Primary Examiner* — Jason S Morrow
*Assistant Examiner* — Sunsurraye Westbrook
(74) *Attorney, Agent, or Firm* — Young Basile Hanlon & MacFarlane P.C.

(57) ABSTRACT

There is disclosed a passenger service vehicle having an upper deck (100) and a lower deck (110), and a passenger staircase (400) extending between the upper deck and the lower deck. The staircase is positioned internal to the vehicle. In some examples, the staircase has at least an upper stair portion and a secondary stair portion, where the upper stair portion is connected to the upper deck and comprises at least one tread, and further connected to the secondary stair portion via an intermediate landing (420, 440), whereby the secondary stair portion extends parallel with respect to the length of the upper deck, and the upper stair portion extends transversely, and in some cases perpendicularly, with respect to the secondary stair portion. In some examples, the staircase comprises a lower stair portion. One embodiment envisages a U-shaped staircase. In some further examples, the staircase is described together with a fuel tank configuration.

17 Claims, 8 Drawing Sheets

(56) References Cited

U.S. PATENT DOCUMENTS 3,971,455 A * 7/1976 Molzon .................. 180/89.1
5,651,579 A * 7/1997 Krieger .................. 296/178
5,967,583 A * 10/1999 Wishart ................. 296/156

FOREIGN PATENT DOCUMENTS

| FR | 873639 | | 7/1942 |
|---|---|---|---|
| GB | 175541 | | 2/1922 |
| GB | 314285 | A | 6/1929 |
| GB | 432608 | | 7/1935 |
| GB | 459736 | | 1/1937 |
| GB | 848789 | | 9/1960 |
| GB | 880684 | | 10/1961 |
| GB | 882353 | | 11/1961 |
| GB | 885941 | | 1/1962 |
| GB | 928649 | | 6/1963 |
| GB | 968044 | | 8/1964 |
| GB | 2424856 | A | 10/2006 |

* cited by examiner

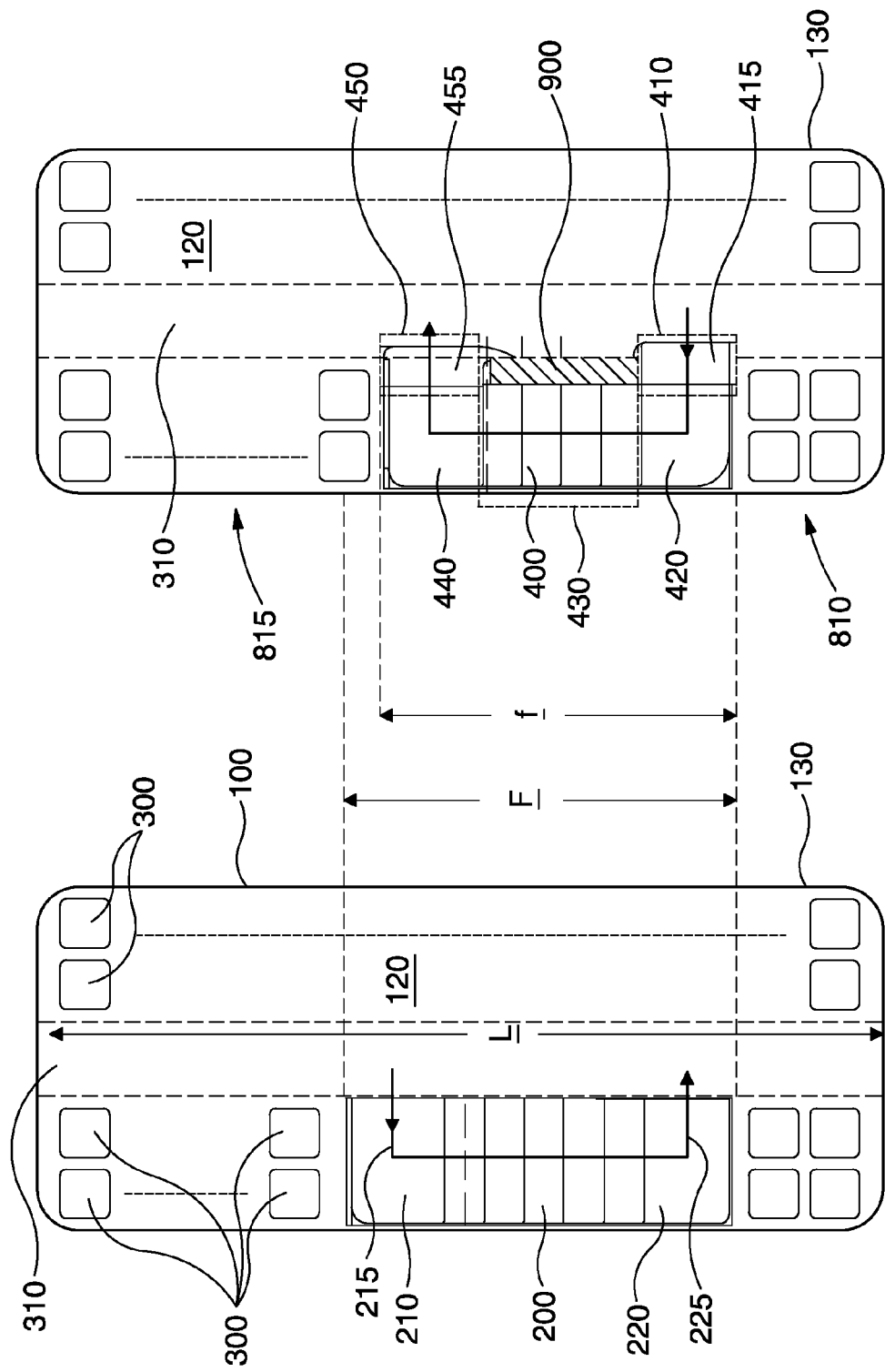

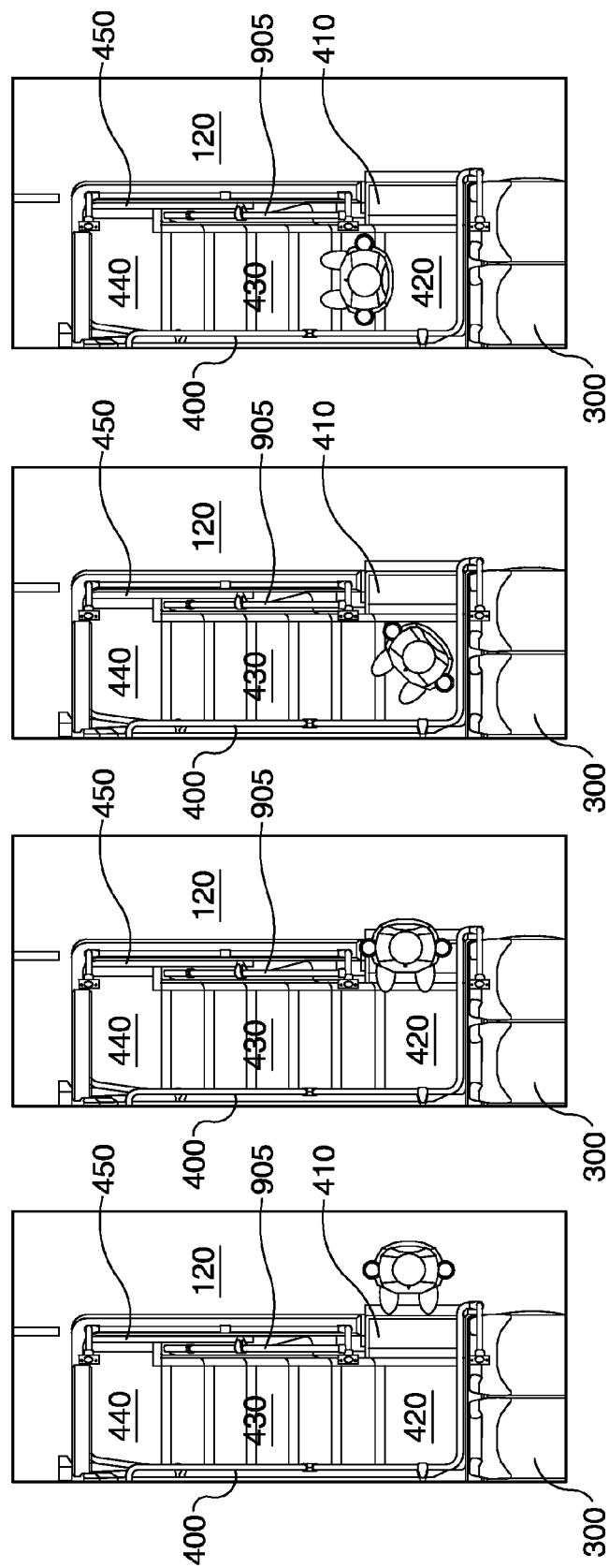

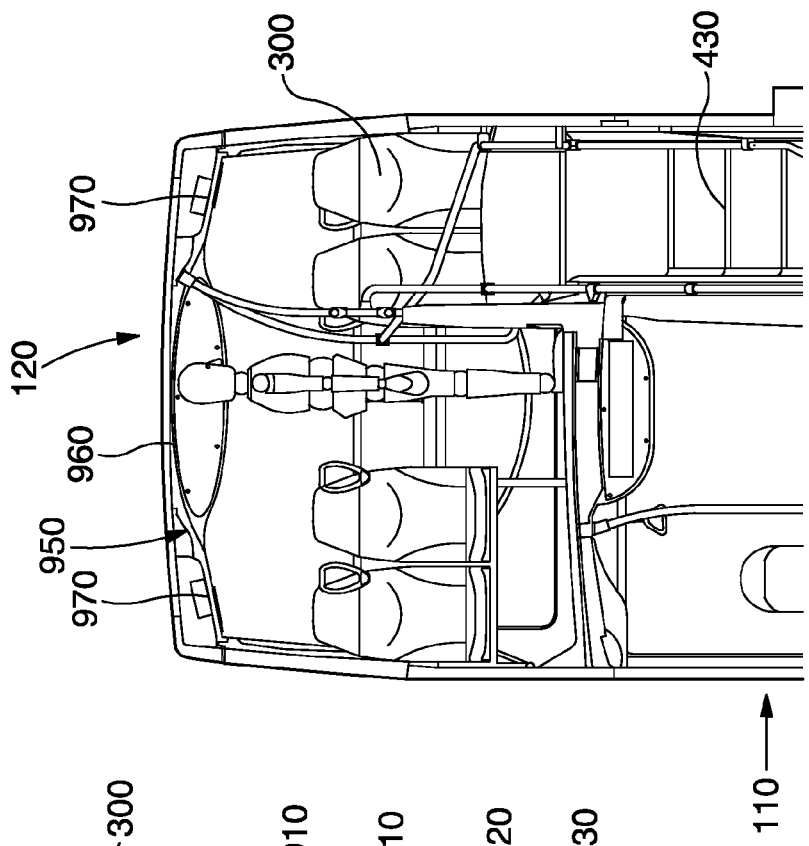
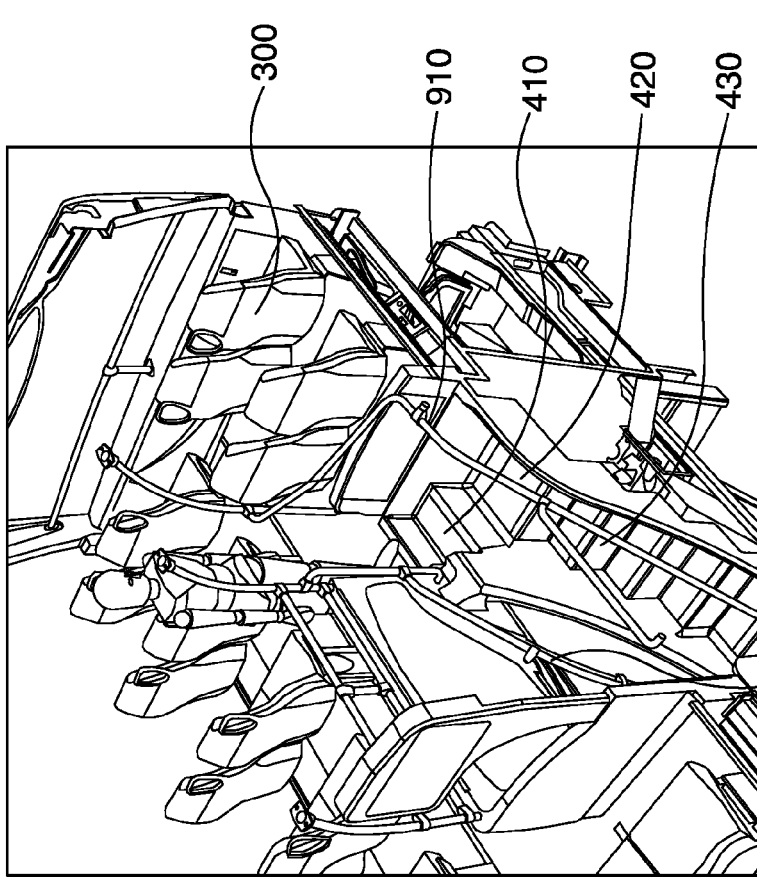
Fig. 4a
Fig. 5a

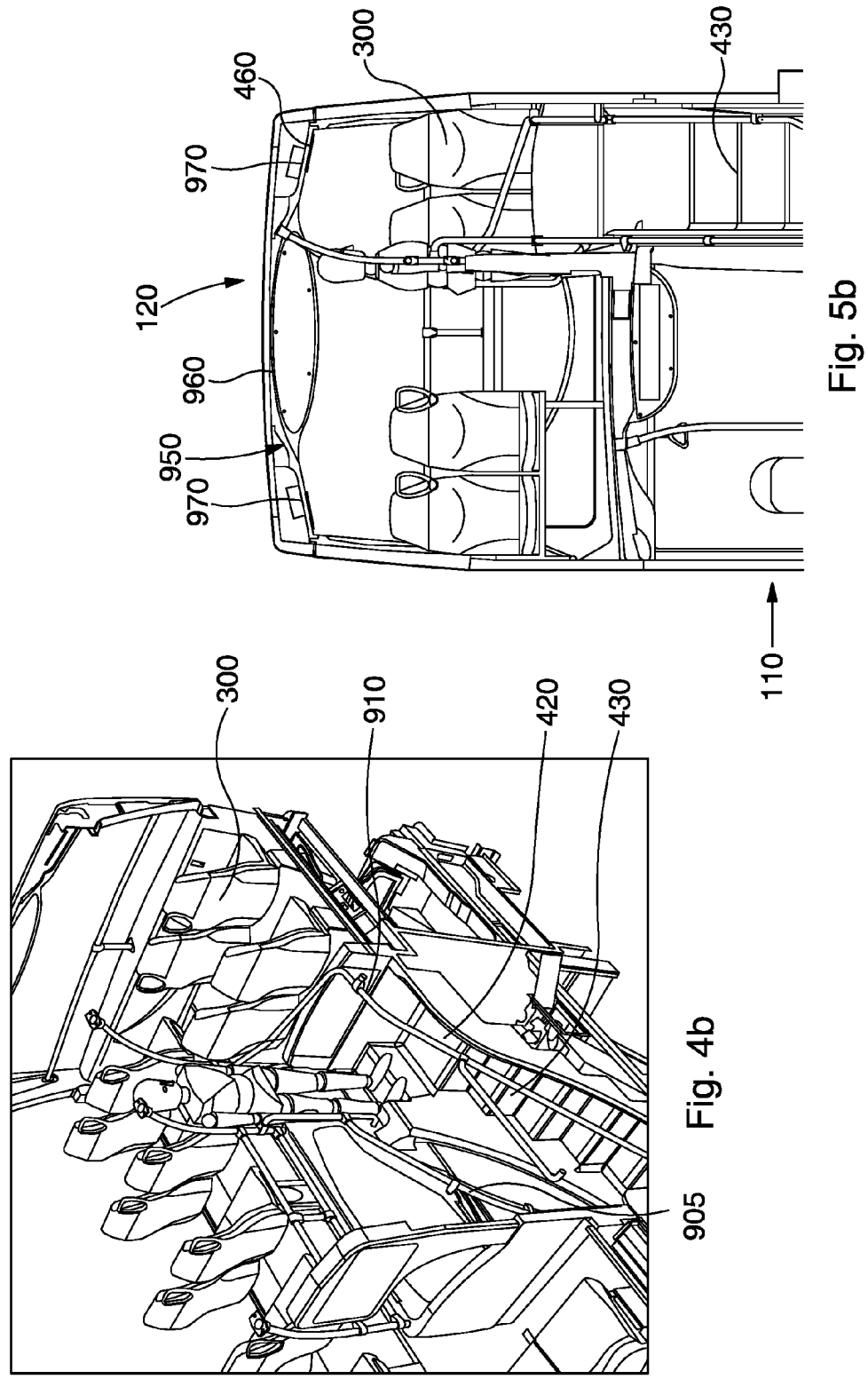

PASSENGER SERVICE VEHICLE

CROSS-REFERENCE TO RELATED APPLICATIONS

The following application is a United States national stage application of International Patent Application No. PCT/GB2013/051196, filed on May 8, 2013, which claims the benefit of United Kingdom Application No. 1208014.9 filed on May 8, 2012.

TECHNICAL FIELD

The invention relates to the field of passenger service vehicles. In particular, but not exclusively, the invention relates to passenger service vehicles having an upper deck and a lower deck, and a staircase extending between the upper deck and the lower deck.

BACKGROUND

Significant innovation and technology development has occurred in recent years in relation to the design of passenger service vehicles. In particular, there has been a continued drive towards providing vehicles that allow for reduced weight and running costs, improved passenger capacity and ergonomics, improved fuel efficiency and improved fuel capacity, etc., while at the same time maintaining or improving the safety of those vehicles.

Some passenger service vehicles comprise upper and lower decks to accommodate more passengers. These vehicles are commonly referred to as double-deck vehicles. Passenger staircases are provided to allow passengers to move between those decks.

This background serves only to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to a first aspect, there is provided a passenger service vehicle having an upper deck and a lower deck, and a passenger staircase extending between the upper deck and the lower deck. The staircase may provide one or more of improved passenger capacity and/or ergonomics, improved fuel efficiency and/or improved fuel capacity, maintaining or improving the safety of such vehicles.

The staircase may have at least an upper stair portion and a secondary stair portion. The upper stair portion may be positioned at, for example connected to, the upper deck. The upper stair portion may comprise at least one tread (e.g. one tread and one corresponding riser). The upper stair portion may be further connected to the secondary stair portion, for example, via an intermediate landing. The upper stair portion may extend transversely with respect to the secondary stair portion.

The upper stair portion may extend perpendicular with respect to the secondary stair portion. The upper deck may extend for a length of the vehicle, and the upper stair portion may extend perpendicularly with respect to the length of the upper deck. The secondary stair portion may extend parallel with respect to the length of the upper deck. The intermediate landing may be considered to be a quarter landing.

The staircase may comprise a lower stair portion. The lower stair portion may be connected to the lower deck. The lower stair portion may comprise at least one tread (e.g. one tread and one corresponding riser). The lower stair portion may be connected to the secondary stair portion via an intermediate landing (i.e. the staircase having a lower intermediate landing and an upper intermediate landing). The lower stair portion may extend transversely with respect to the secondary stair portion.

The lower stair portion may extend perpendicularly with respect to the secondary stair portion. The lower deck may extend for a length of the vehicle (e.g. in the same manner as the upper deck), and the lower stair portion may extend perpendicularly with respect to the length of the lower deck. The lower intermediate landing may be considered to be a quarter landing.

The upper, secondary and lower stair portions may be considered to be configured generally in a U-shape. The upper, secondary and lower portions may be considered to provide three different directions (e.g. different and distinct) of travel for a passenger moving from the upper deck to the lower deck (and vice versa).

The upper stair portion may comprise a plurality of treads. The upper stair portion may comprise only one tread (e.g. one tread and one corresponding riser). The lower stair portion may comprise a plurality of treads (e.g. treads and risers). The lower stair portion may comprise only one tread (e.g. one tread and one corresponding riser). The secondary stair portion may comprise a plurality of treads, for example, the secondary stair portion may comprise four treads.

Each stair portion may have the same, or similar, sized steps. Each tread and/or riser of the steps may be the same, or substantially the same. The tread of each step may be substantially rectangular. Some or all steps may be the same width and height. The upper and lower intermediate landings may be the same size. For example, a platform area of the landings may be the same, or substantially the same on the upper and lower intermediate landings. The landings may be squarely shaped, or at least be a different shape of rectangle to the treads of the steps of the stair portions.

The staircase may be configured essentially at one side of the vehicle, such as the far side, or driver's side, of the vehicle. The staircase may be an internal staircase. The staircase may be an integral staircase; for example, the staircase may be considered integral in that the treads and risers of each connect to one another without gaps.

The staircase may be provided rearward of a driver's area. The staircase may be positioned to be between a driver's area on the lower deck and a passenger area on the lower deck. The passenger area may comprise one or more passenger seats. The lower stair portion may be positioned between the driver's area and the passenger area on the lower deck of the vehicle. The upper stair portion may be positioned between a forward passenger area and a rearward passenger area on the upper deck of the vehicle. Those forward and rearward passenger areas may comprise a plurality of passenger seats.

The lower stair portion may not extend, or not extend significantly, into a lower deck gangway. For example, the staircase may be configured such that the lower stair portion does not extend beyond 10 cm into the lower gangway (e.g. less that around 8 cm). In some examples, the lower stair portion may not extend into the lower gangway at all. In other words, the vehicle and staircase may be configured such that the gangway along the lower deck of the vehicle has a common width at least at the staircase region and, in some cases, along some or all of the length of the remainder of the lower gangway/vehicle.

The lower deck gangway width, at the region that the lower stair portion meets the gangway, may exceed 700 mm, or may even be at or exceed 750 mm. Such a configuration may maintain ease of access along the gangway of the lower deck.

Similarly, the upper stair portion may not extend, or not extend significantly, into an upper deck gangway. For example, the staircase may be configured such that the upper stair portion does not extend beyond 10 cm into the upper deck gangway (e.g. less than around 8 cm). In some examples, the upper stair portion may not extend into the upper gangway at all. In other words, the vehicle and staircase may be configured such that the gangway along the upper deck of the vehicle has a common width at least at the staircase region and, in some cases, along some or all of the length of the remainder of the upper gangway/vehicle.

The upper deck gangway width, at the region that the upper stair portion meets the gangway, may exceed 600 mm, or may even be at or exceed 650 mm. Such a configuration may maintain ease of access along the gangway of the upper deck.

The staircase may be configured such that a recess, or the like, is effectively formed or defined by the upper stair portion. In some examples, the recess may be formed or defined by the upper stair portion and the lower stair portion. That recess may be formed or defined between the upper and lower stair portions, and between the secondary stair portion and the gangways of the vehicle. For example, in some cases (e.g. when the upper/lower stair portions do not extend, or do not extend significantly into respective gangways) a recess may be formed between the gangways of the vehicle and the secondary stair portion. In some examples, that recess may be utilised to accommodate an inner handrail, or other such passenger support, extending along some or all of the secondary stair portion. In such a way, utilisation of the recess for the inner handrail may not unduly reduce the width, or effective width, of the secondary stair portion. The width or effective width of the secondary stair portion may be similar, or the same, or substantially the same, as one or both of the upper and lower stair portions. In some examples, the secondary stair portion may additionally comprise an outer handrail, extended along some or all of the secondary stair portion, opposite the inner handrail.

The recess formed between the gangway, and in particular the lower deck gangway, and the secondary stair portion, may be open, or may be fully or partially occluded. When open, a passenger travelling on the staircase may achieve a sense of space within the vehicle. When occluded, the effective ducting between the lower deck and the upper deck may be reduced, improving further any thermal isolation between each deck.

In some examples, the recess may be configured as a storage recess (e.g. to allow for control systems, wireless routers, etc.), and/or may be configured as a passenger storage.

The upper deck may comprise a profiled interior roof. The profiled interior roof may comprise a gangway region positioned roughly above the gangway of the upper deck. The profiled interior roof may comprise side regions. Those side regions may extend above some or all of the passenger seats on either side of the vehicle. The side regions may be configured for ducting such as concealed ducting and/or storage (e.g. passenger bag storage).

The staircase and interior roof may be configured in a complementary manner, such that passenger space (e.g. height) provided between the gangway of the upper deck and the gangway region of the roof is similar, or the same, as the passenger space (e.g. height) provided between the upper stair portion and the side region at that staircase. In such a way, the side region when used for storage and or ducting can be maximised, while at the same time a passenger need not unduly duck or crouch when stepping from the upper gangway to the staircase, and vice versa.

In some examples, the gangway region is additionally or alternatively similar, or the same, as the passenger space (e.g. height) provided between the upper intermediate landing and the side region of the roof at the staircase.

The vehicle may comprise a fuel tank (e.g. a tank for gasoline, hydrogen, etc.). The tank may be configured below the staircase. For example, the tank may be configured between, or substantially between, the staircase and a chassis of the vehicle. The tank may be configured between staircase and a wheel axle of the vehicle.

The tank may comprise a body portion. The body portion may be configured to extend in a complementary, or corresponding, manner with respect to the secondary stair portion of the staircase. For example, the body portion may be considered to extend obliquely. An outer profile region of the body portion may correspond with the inclination of some or all of the secondary stair portion.

The tank may comprise a base portion. The base portion may be configured to extend in a complementary, or corresponding, manner with some or all of the lower intermediate landing. For example, some or all of an upper surface of the base portion may extend in a corresponding, or complementary manner, with respect to the lower intermediate landing. The upper surface of the base portion may be commonly spaced from the lower intermediate landing. An outer profile region of the base portion may correspond with some or all of the profile of the lower intermediate landing. Some or all of the base portion may be considered to extend laterally (e.g. as opposed to obliquely) with respect to the vehicle.

The base portion may extend into a recess in the chassis and, for example, extend into an aperture defined by the chassis (e.g. the aperture being defined by supporting members of the chassis). The tank may comprise a fuel inlet. The inlet may be positioned at an upper region of the body portion.

The vehicle may be a double-axle vehicle, or a triple-axle vehicle.

According to a second aspect, there is provided a passenger service vehicle having an upper deck and a lower deck, and a passenger staircase extending between the upper deck and the lower deck, the staircase having at least a lower stair portion and a secondary stair portion, the lower stair portion being connected to the lower deck and comprising at least one tread, and being further connected to the secondary stair portion via an intermediate landing, the lower stair portion extending transversely with respect to the secondary stair portion, the vehicle further comprising a fuel tank having a body portion, configured to extend in a complementary, or corresponding, manner with respect to the secondary stair portion of the staircase, and a base portion configured to extend in a complementary, or corresponding, manner with some or all of the intermediate landing.

The body portion may be considered to extend obliquely, with respect to the vehicle. The base portion may be considered to extend laterally with respect to the vehicle.

The base portion may extend into a recess in the chassis, for example, into an aperture defined in the chassis. The tank may comprise a fuel inlet, positioned at an upper region of the body portion. The inlet may be configured to allow a user to provide fluid, such as gasoline, hydrogen, etc. into the tank.

According to a third aspect, there is provided a passenger service vehicle having an upper deck and a lower deck, and a passenger staircase extending between the upper deck and the lower deck, the staircase having at least a first stair portion and a second stair portion, the first stair portion being positioned at the upper deck and comprising at least one tread, and being in stepped communication with the second stair portion via an intermediate landing, the first stair portion extending transversely with respect to the second stair portion.

According to a fourth aspect, there is provided a passenger service vehicle having an upper deck and a lower deck, and a passenger staircase extending between the upper deck and the lower deck, the staircase having at least an upper stair portion and a secondary stair portion, the upper stair portion being connected to the upper deck and comprising at least one tread, and being further connected to the secondary stair portion via an intermediate landing, the upper stair portion extending transversely with respect to the secondary stair portion.

According to a fifth aspect, there is a method comprising:
providing a passenger service vehicle having an upper deck and a lower deck,
providing a staircase extending between the upper deck and the lower deck, the staircase having at least an upper stair portion comprising at least one tread, and a secondary stair portion,
providing the upper stair portion at the upper deck, the upper stair portion being connected to the secondary stair portion via an intermediate landing and the upper stair portion extending transversely with respect to the secondary stair portion.

According to a sixth aspect, there is a method comprising:
providing a passenger service vehicle having an upper deck and a lower deck,
providing a staircase extending between the upper deck and the lower deck, the staircase having at least a lower stair portion comprising at least one tread, and a secondary stair portion,
providing the lower stair portion at the lower deck, the lower stair portion being connected to the secondary stair portion via an intermediate landing and the lower stair portion extending transversely with respect to the secondary stair portion.
providing a fuel tank such that a body portion extends in a complementary, or corresponding, manner with respect to the secondary stair portion of the staircase, and a base portion extends in a complementary, or corresponding, manner with some or all of the intermediate landing.

According to a seventh aspect, there is use of a passenger vehicle according to any of the first, second, third or fourth aspects.

According to an eighth aspect, there is a staircase for a passenger service vehicle.

The passenger staircase may be configured to extend between an upper deck and a lower deck of the passenger service vehicle.

The staircase may have at least an upper stair portion and a secondary stair portion. The upper stair portion may be configured to be positioned at, for example connected to, an upper deck. The upper stair portion may comprise at least one tread. The upper stair portion may be connected, or connectable, to the secondary stair portion, for example, via an intermediate landing. The upper stair portion may extend transversely with respect to the secondary stair portion.

The staircase may comprise a lower stair portion. The lower stair portion may be configured to connect to the lower deck. The lower stair portion may comprise at least one tread. The lower stair portion may be connected, or connectable, to the secondary stair portion via an intermediate landing (i.e. the staircase having a lower intermediate landing and an upper intermediate landing). The lower stair portion may extend transversely with respect to the secondary stair portion.

According to a ninth aspect, there is a fuel tank for a passenger service vehicle.

The tank may have a body portion, configured to extend in a complementary, or corresponding, manner with respect to a secondary stair portion of a staircase of the vehicle. The tank may comprise a base portion configured to extend in a complementary, or corresponding, manner with some or all of an intermediate landing of a staircase.

According to a tenth aspect, there is provided a passenger service vehicle comprising a staircase, the staircase having upper, secondary and lower stair portions configured in a U-shape.

The upper, secondary and lower portions may be considered to provide three different directions of travel for a passenger moving from the upper deck to the lower deck (and vice versa).

The staircase may be configured such that a recess, or the like, is effectively formed using the upper stair portion (e.g. between the upper and lower stair portions). That recess may be formed between the upper and lower stair portions, and between the secondary stair portion and gangways of the vehicle. For example, in some cases (e.g. when the upper/lower stair portions do not extend, or do not extend significantly into respective gangways) a recess may be formed between the gangways of the vehicle and the secondary stair portion. In some examples, that recess may be utilised to accommodate an inner handrail, extending along some or all of the secondary stair portion. In some examples, the secondary stair portion may additionally/alternatively comprise an outer handrail, extended along some or all of the secondary stair portion.

The upper deck may comprise a profiled interior roof. The profiled interior roof may comprise a gangway region, positioned roughly above the gangway of the deck. The profiled interior roof may comprise side regions. Those side regions may extend above some or all of the passenger seats on either side of the vehicle. The side regions may be configured for ducting such as concealed ducting, and/or storage (e.g. passenger bag storage).

The staircase and interior roof may be configured in a complementary manner, such that passenger space (e.g. height) provided between the upper gangway and the gangway region of the roof is similar, or the same, as the passenger space (e.g. height) provided between the upper stair portion and the side region at the staircase. In some examples, the gangway region is additionally or alternatively similar, or the same, as the passenger space (e.g. height) provided between the upper intermediate landing and the side region.

The invention includes one or more corresponding aspects, embodiments or features in isolation or in various combinations whether or not specifically stated (including claimed) in that combination or in isolation. For example, features associated with particular recited embodiments relating to the first aspect may be equally appropriate as features of embodiments relating the second, third, fourth, fifth, sixth, seventh, eighth, ninth or tenth aspects, and vice versa. As will be appreciated features associated with particular recited embodiments relating to methods may be equally appropriate as features of embodiments relating specifically to apparatus, and vice versa.

It will be appreciated that one or more embodiments/aspects may be useful in providing a staircase for passenger service vehicles.

The above summary is intended to be merely exemplary and non-limiting.

BRIEF DESCRIPTION OF THE FIGURES

A description is now given, by way of example only, with reference to the accompanying drawings, in which:—

FIG. 2a shows a plan view of an upper deck of a vehicle having a staircase, and FIG. 2b shows an plan view of an upper deck of a vehicle having an alternative staircase; and FIGS. 3a-3d show a passenger descending from the upper deck using the staircase of FIG. 2b;

FIGS. 4a-4d show perspective representations corresponding to FIGS. 3a-3d;

FIGS. 5a-5d show side view representations corresponding to FIGS. 3a-3d; and

DESCRIPTION OF SPECIFIC EMBODIMENTS

Figure 1:
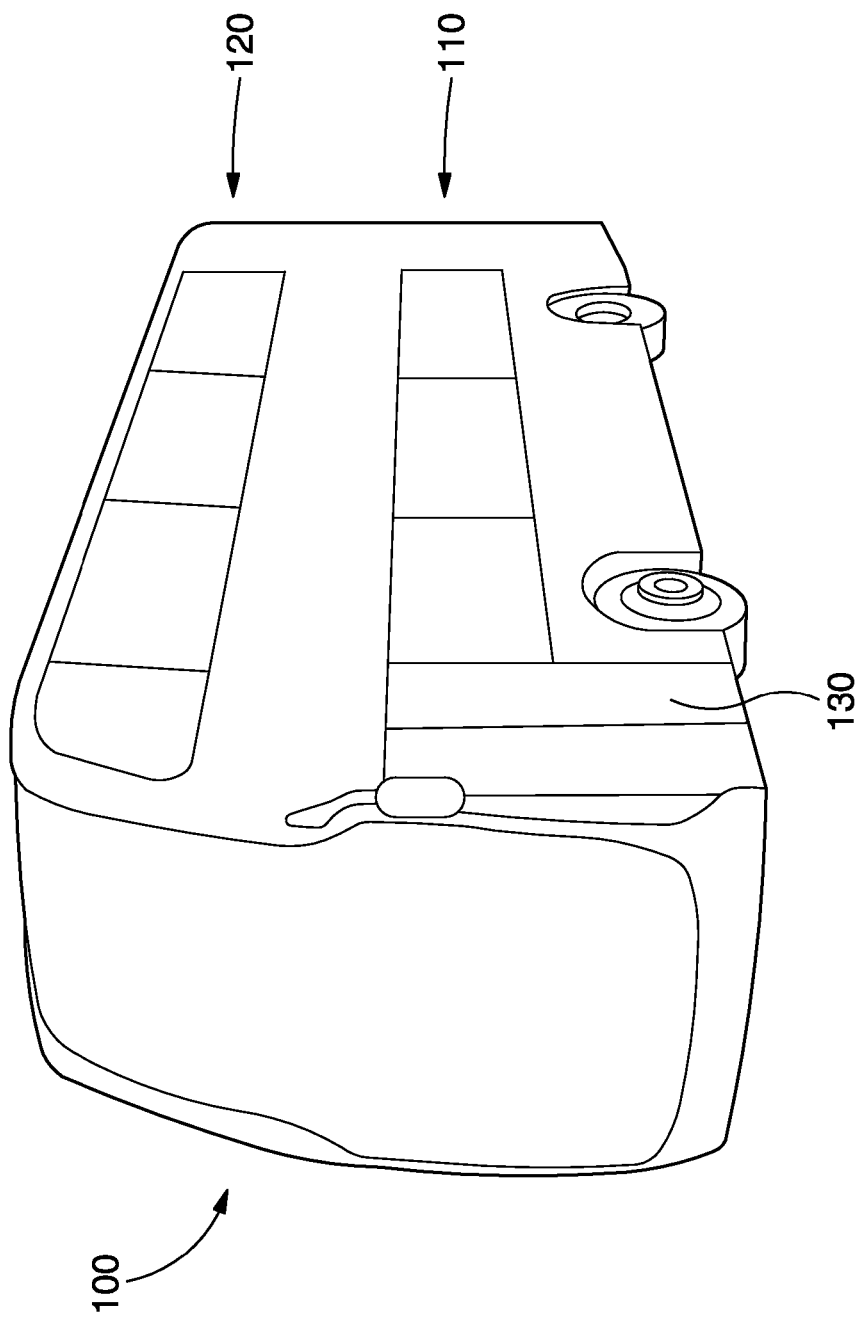
FIG. 1 shows a perspective view of a passenger service vehicle having an upper deck and a lower deck.

FIG. 1 shows a perspective representation of a passenger service vehicle 100, which, in this example, is shown as a vehicle 100 having both a lower passenger deck 110 (lower deck) and an upper passenger deck 120 (upper deck). Such vehicles 100 are commonly referred to as twin-deck, or double-deck, vehicles 100. Such vehicles 100 can be used to accommodate more passengers than, for example, a vehicle 100 having only a single deck (e.g. 110). An entrance 130 in provided at the vehicle 100 to allow passengers to enter and leave the vehicle 100. In this case, that entrance 130 is shown as doors at the front, and nearside, of the vehicle 100. A staircase is generally provided in order to allow a passenger to travel between the decks 110, 120.

FIG. 2a shows an exemplary plan representation of the upper deck 120 of the vehicle 100 having a staircase 200 that extends between the upper deck 120 and the lower deck 110. The staircase 200 is configured essentially at one side of the vehicle 100, which, in this example, is the driver's side of the vehicle. The staircase 200 can be considered to be an internal staircase and, in some cases, integral in as much as the treads and risers of the steps each connect to one another without gaps.

FIG. 2a further shows a plurality of passenger seats 300 extending along the length, L, of the vehicle 100, and which are separated by an aisle 310, or so-called gangway. In this example, the seats 300 are arranged in pairs either side of the gangway 310. For clarity, not all seats 300 are shown.

When a passenger boards the vehicle 100, they have the option of moving from the lower deck 110 to the upper deck 120 to find a seat 300. In doing so, a passenger initially steps from the gangway of the lower deck 110 onto a lower landing 210, or platform, as shown by the arrow at 215. The passenger then can ascend the staircase 200 until they reach an upper landing 220, or platform, from which they can step onto the upper deck 120, as is shown at 225. When a passenger wishes to leave the vehicle 100 from the upper deck 120, they can use the staircase 200 in a reverse manner.

It will be appreciated that the height gained by the staircase 200 is, in some ways, associated with the height between the lower and upper decks 110, 120, and that this height between the lower deck 110 and the upper deck 120 should be sufficient to accommodate the height of a typical standing passenger, but at the same time not be too high so as to compromise the centre of gravity of the vehicle, or increase unduly the overall height of the vehicle 100. Furthermore, it will be appreciated that the treads and risers of the steps of the staircase 200 may be of a particular size. For example, reducing the size of the tread significantly may reduce the safety of the staircase 200. Similarly, increasing the height of the riser significantly may reduce the safely of the staircase 200.

FIG. 2b shows a further example of the vehicle 100, having an alternative staircase 400, again extending between the upper deck 120 and the lower deck 110. Here, the staircase 400 is positioned at the lower deck to be between a driver's area 800 and a passenger area 805 (e.g. see FIG. 6). In this example, the staircase 400 has an upper stair portion 410, which is positioned at (and in this example connected to) the upper deck 120. In this case, the upper stair portion 410 comprises one tread 415. That tread 415 is connected to the upper gangway via a riser, in a known manner.

The staircase 400 further comprises a secondary stair portion 430, which is connected to the upper stair portion 410 via an intermediate landing 420 (e.g. an upper intermediate landing). Here, the secondary stair portion comprises four treads. The upper stair portion 410 is connected to the landing 420, and so too the secondary stair portion 430, such that the upper stair portion 410 effectively extends transversely with respect to the secondary stair portion 430. In this particular example, the upper stair portion 410 extends perpendicularly with respect to the secondary stair portion 430. The intermediate landing 420 may be considered to be a quarter landing.

Furthermore, the upper stair portion 410 extends perpendicularly with respect to the length, L, of the upper deck 120, and the secondary stair portion 430 essentially extends parallel with respect to the length, L, of the upper deck 120.

By way of an example, the staircase 400 further comprises a lower stair portion 450. The lower stair portion 450 is positioned at, and in this example connected to, the lower deck 110. In a similar manner to the upper stair portion 410, the lower stair portion 450 comprises one tread 455. That tread 455 is connected to the lower gangway via a riser, in a known manner. The lower stair portion 450 is connected to the secondary stair portion 430 via a further intermediate landing 440 (i.e. the staircase 400 having a lower intermediate landing 440 and an upper intermediate landing 420). The lower stair portion 450 extends transversely, and in this case perpendicularly, with respect to the secondary stair portion 430.

Here, the lower stair portion 450 can be considered to extend perpendicularly with respect to the length of the lower deck. The lower intermediate landing 440 may also be considered to be a quarter landing.

As such, the lower stair portion 450 may be considered to be positioned between the driver's area 800 and the passenger area 805 on the lower deck 110 of the vehicle, while the upper stair portion 410 may be considered to be between a forward passenger area 810 and a rearward passenger area 815 on the upper deck 120 of the vehicle 100. Of course, while the lower stair portion 450 may be considered to be positioned between the driver's area 800 and the passenger area 805 on the lower deck 110 of the vehicle, in some examples there may still be passenger seating, or storage, between the driver's area and the staircase 400.

The upper, secondary and lower stair portions 410, 430, 450 can be considered to be configured in a U-shape. The upper, secondary and lower portions 410, 430, 450 provide three different directions of travel for a passenger moving from the upper deck 120 to the lower deck 110 (and vice versa).

In this example, each stair portion 410, 430, 450 can have the same or similar sized steps, such that each tread and/or riser of the steps are the same or substantially the same. The tread of each step is shown as substantially rectangular. Additionally, the upper and lower intermediate landings 420, 440 are shown as the same size, such that a platform area of the landings 420, 440 is the same or substantially the same on the upper and lower intermediate landings 420, 440. Here, the general shape of the intermediate landings is different from that of the treads of the stair portions. In this example, the size of the landings is larger than the size of treads of the steps.

In many examples, the lower stair portion 450 does not extend, or at least does not extend significantly, into a lower deck gangway 310. In this particular example, the staircase 400 is configured such that the lower stair portion 450 does not extend beyond 10 cm into the lower gangway 310 (e.g. less that around 8 cm). However, in some examples, the staircase is specifically configured such that lower stair portion 450 does not extend at all into the lower deck gangway 310. In those instances, the vehicle 100 and staircase 400 are configured such that gangway 310 along the lower deck 110 of the vehicle 100 has a common width at least with the staircase region. In some cases, that common width may be maintained along much or all of the length of the remainder of the lower gangway 310/vehicle 100.

The staircase 400 may be configured such that the lower deck gangway 310 width, at the region that the lower stair portion 450 meets the gangway 310, exceeds 700 mm, or even exceeds 750 mm. Such a configuration may maintain ease of access along the gangway 310 of the lower deck 110.

Similarly, the upper stair portion 410 is configured not to extend, or at least not to extend significantly, into the gangway 310 of the upper deck 120. In some examples, the staircase 400 is configured such that the upper stair portion 410 does not extend beyond 10 cm into the upper deck gangway 310 (e.g. less than around 8 cm). Again, minimising any intrusion of the upper stair portion 410 into the upper gangway 310 can assist in maintaining the overall width of the gangway 310 along the deck.

Of course, in further examples, the upper stair portion may not extend into the upper gangway at all. In other words, the vehicle 100 and staircase 400 may be configured such that the gangway 310 along the upper deck of the vehicle 100 has a common width at least with the staircase region and, in some cases, along some or all of the length of the remainder of the upper gangway/vehicle.

In this example, the upper deck gangway width, at the region that the upper stair portion 410 meets the gangway 310, exceeds 600 mm, and in some cases, exceeds 650 mm. Such a configuration can maintain ease of access along the gangway of the upper deck.

Here, the staircase 400 and the vehicle 100 are further configured such that a recess 900, or the like, is effectively formed or defined between the upper and lower stair portions 410, 450. That recess 900 can be considered to be formed between the upper and lower stair portions 410, 450 and between the secondary stair portion 430 and the gangways 310 of the vehicle 100. In some examples, without a lower stair portion, the recess may be defined or formed between upper and secondary stair portions, as will be appreciated.

In this particular example, the recess 900 is utilised to accommodate an inner handrail 905, which extends along some or all of the secondary stair portion 430 (see FIGS. 3a-3d). In such a way, utilisation of the recess 900 for the inner handrail 905 does not need to unduly reduce the width, or effective width, of the secondary stair portion 430 when comparing the upper and lower stair portions. As such, the width or effective width of the secondary stair portion 430 can be similar, or the same, or substantially the same, as one or both of the upper and lower stair portions 410, 450, thus improving the ease with which a passenger can travel on the staircase 400, allowing for the provision on suitable handrails and not comprising on safety. In the example shown, the secondary stair portion 430 can additionally comprise an outer handrail 910 extended along some or all of the secondary stair portion 430.

Of course, in some examples, the recess may be additionally/alternatively be configured as a recess for storage. For example, the recess may be configured to allow for storage of vehicle control systems, wireless routers, etc. It will be appreciated that providing such storage in proximity to the passenger area 805 can minimise any wiring or cabling or the like that otherwise runs between any user controls (e.g. at the driver's area) to those control units, routers, etc. Further, providing such storage at the recess 900 allows for ease of access and maintenance from within the vehicle 100. In further examples, the recess may be used for passenger storage. Providing such storage towards the front of the vehicle and on the lower deck may provide ease of use for passengers.

In a similar manner as in relation to FIG. 2a, when a passenger boards the vehicle 100, they have the option of moving from the lower deck 110 to the upper deck 120, for example, to find a seat 300. In some embodiments, for example where the staircase 400 or lower stair portion 450 does not intrude into the gangway 310 of the lower deck 110, then the passenger can easily move to other passenger areas within that lower deck 110. This may be particularly relevant if the passenger uses a wheelchair or has other mobility needs.

However, here the passenger initially steps from the lower deck 110 onto a lower stair portion 450. From there, the passenger then steps onto the lower intermediate landing 440, and then turns and steps onto the secondary stair portion 430. As the passenger ascends, they can use the inner handrail 905 provided in the recess 900 together with the outer hand rail, without necessarily perceiving any noticeable change in stair width. As they ascend, they then step onto the upper intermediate landing 420, and then turn and step onto the upper stair portion 410. From the upper stair portion 410, the passenger can then step onto the upper deck 120.

When leaving the upper deck 120, a passenger initially steps from the upper deck 120 onto the upper stair portion 410. From there, the passenger then steps onto the upper intermediate landing 420, and then turns and steps down onto the secondary stair portion 430. As the passenger descends, they then step onto the lower intermediate landing 440, and then turn and step onto the lower stair portion 450, before stepping onto the lower deck 110. FIG. 3a shows a representation of a passenger initially on at the upper deck 120, FIG. 3b shows the passenger having stepped onto the upper stair portion 410, FIG. 3c shows the passenger having stepped onto the upper intermediate landing, and FIG. 3d shows the passenger having stepped onto the secondary stair portion 430. FIGS. 4a to 4d, and 5a to 5d, show corresponding perspective and side views of FIGS. 3a-3d, respectively.

As will be appreciated, one or both of the inner handrail 905 provided in the recess 900, and outer handrail 910 can improve the safely of such vehicles, while still maximising the effective passenger space. Further, passengers falling near the upper deck 120 are of a greater concern to an operator of a passenger service vehicle 100, as opposed to passengers falling near the lower deck 110. While the height descended by the passenger in FIG. 2b is the same as, or similar to, that shown in FIG. 2a, it will be appreciated that, should a passenger fall near the upper deck 120 then, when using the staircase 400 provided in FIG. 2b, that passenger is less likely to fall the entire distance of the staircase 400. In other words, the passenger is less likely to fall as far.

This is because the passenger may fall only down the first stair portion 410, and can be impeded from falling further due to the change in direction, or path, between the upper stair portion 410 and the secondary stair portion 430. Otherwise, a passenger may fall only down the secondary stair portion 430, without falling all the way from the upper deck 120 to the lower deck 110. Providing the upper stair portion 410 and the secondary stair portion 430 removes any long open drop of the straight staircase shown in FIG. 2a. Furthermore, providing a defined change of direction, or path, (e.g. a perpendicular) prevents a passenger from falling a greater length.

By additionally providing the lower stair portion 450, this potential fall is reduced even further. In that case, due to the change of direction, a passenger falling at the secondary stair portion 430 may not fall to the lower deck 110, but may be impeded by the change in direction, or path, at the lower indeterminate landing 440.

Furthermore, as is shown in FIGS. 5a to 5d, in some examples, the upper deck 120 can comprise a profiled interior roof 950. The profiled interior roof 950 comprises a gangway region 960, positioned roughly above the gangway of the deck, together with side regions 970. Those side regions 970 extend above some or all of the passenger seats on either side of the vehicle 100. The side regions 970 may be configured for ducting such as concealed ducting, cabling, air conditioning or ventilation, lighting, and/or storage (e.g. passenger bag storage).

Here, the staircase and interior roof 950 are configured in a complementary manner, such that passenger space (e.g. height) provided between the upper gangway 310 and the gangway region 960 of the roof 950 is similar, or roughly the same, as the passenger space (e.g. height) provided between the upper stair portion 410 and the side region 970 at the staircase 400. In such a way, the provision of the upper stair portion allows for the side region 970 when used for storage and/or ducting to be maximised. At the same time, a passenger need not unduly duck or crouch when stepping from the gangway 310 of the upper deck 120 to the staircase 400, and vice versa.

Figure 5C:
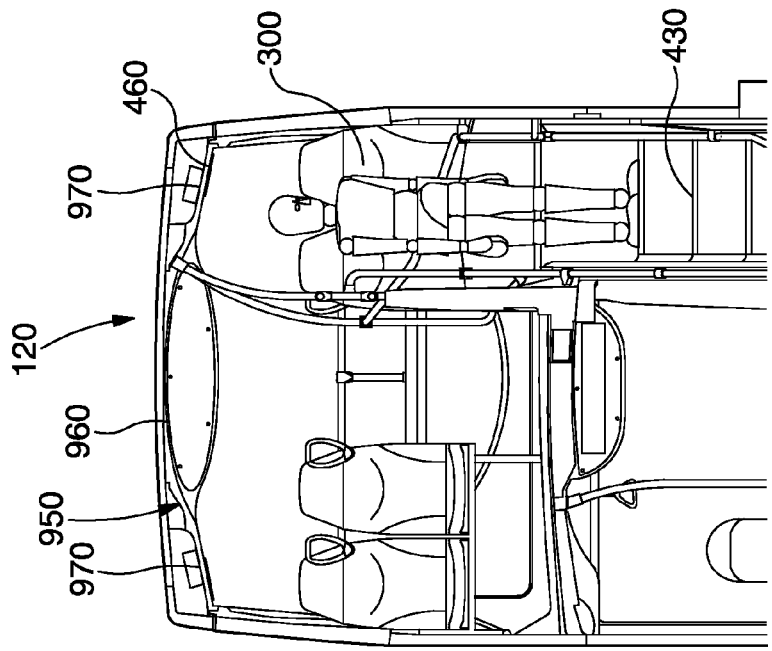
Figure 4C:
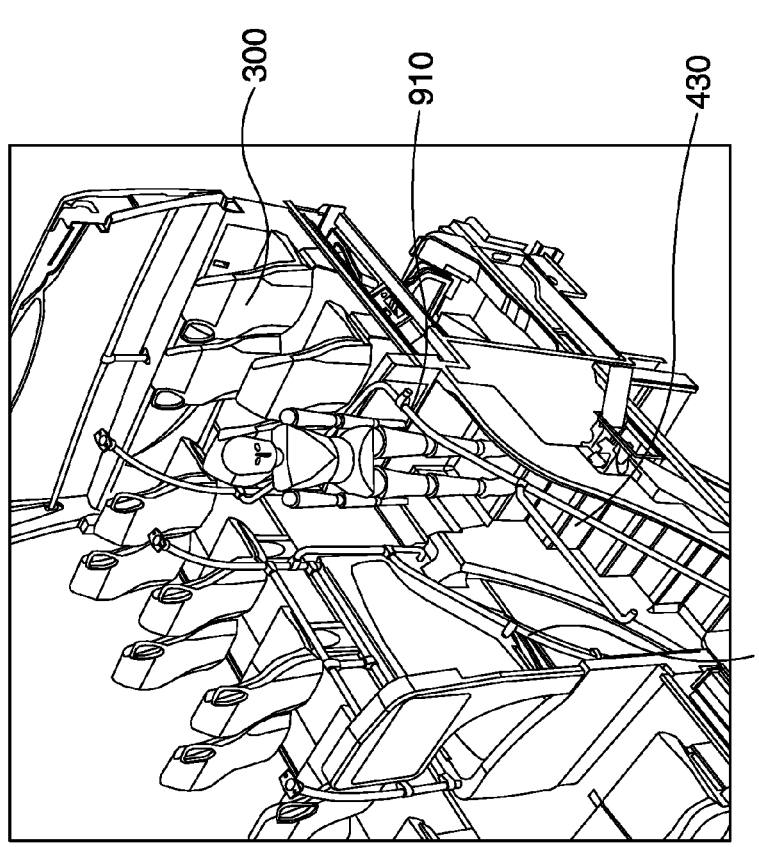
Figure 5D:
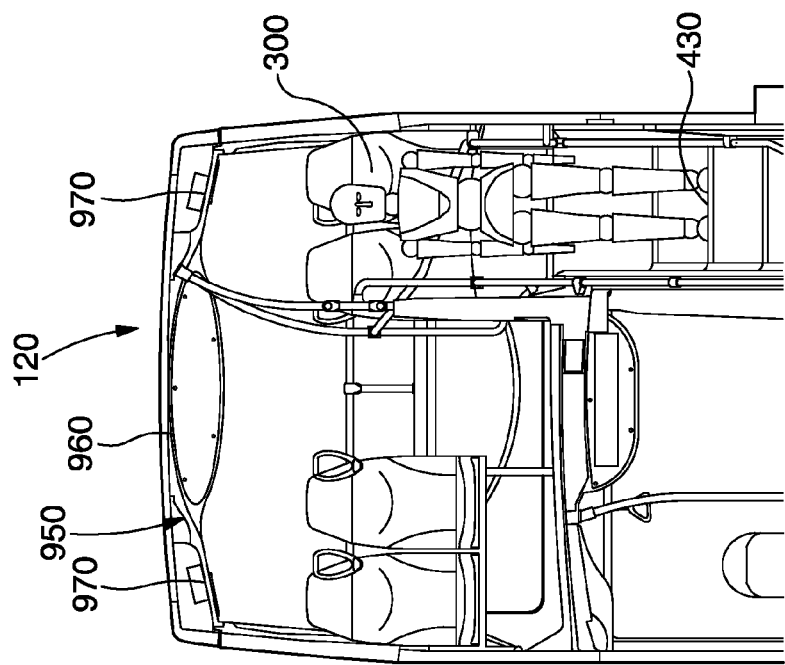
Figure 4D:
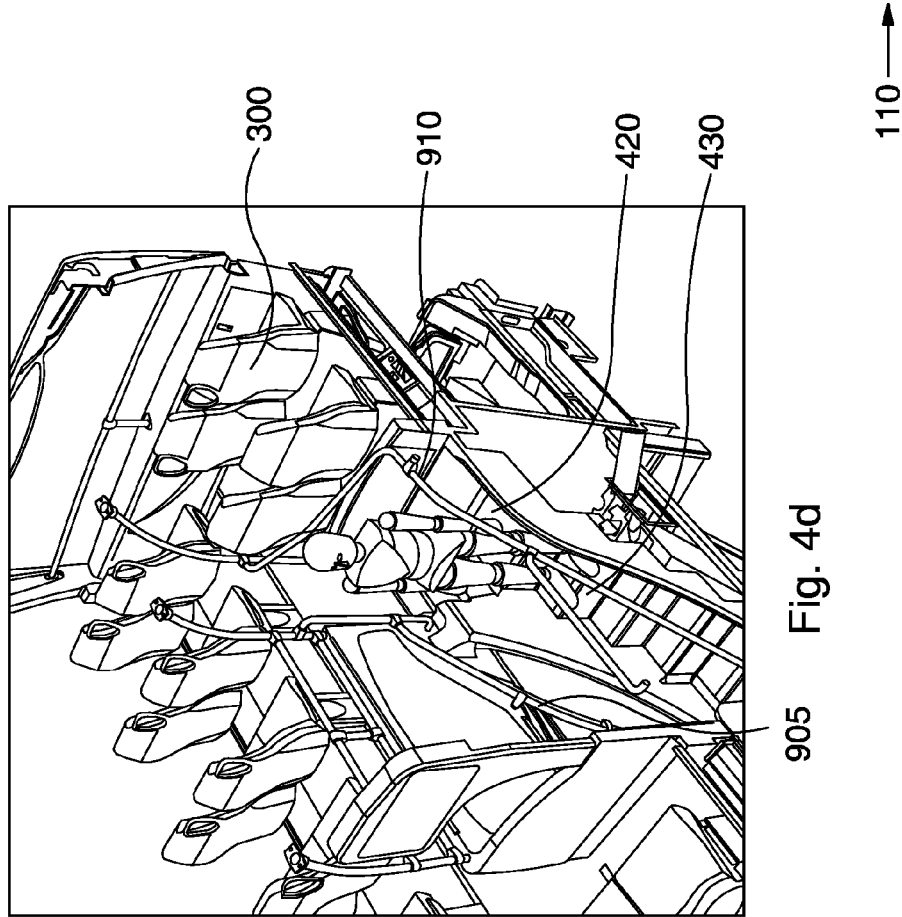

Further, as is shown in FIGS. 5b and 5c, providing an upper stair portion 410 and a secondary stair portion 430, in the manner described, increases a clearance 460 above the passengers head as they ascend and descend the staircase 400 at the upper deck 120, when compared to the staircase shown in FIG. 2a.

As such, the staircase 400 shown in FIG. 2b is easier to ascend and descend than that shown in FIG. 2a . Again, a passenger may feel less likely to need to duck or crouch when reaching the upper deck 120.

Furthermore, as is shown in FIGS. 2a and 2b, the effective footprint, F, (e.g. the lengthwise footprint) of the staircase 400 shown in FIG. 2b is less than the effective footprint, F, of the staircase 200 shown in FIG. 2a. As such, more space can be provided along the length, L, of one or both of the lower and upper decks 110, 120. This can allow for additional seating 300 for passengers or more space for passengers for the same or similar number of seats 300, or the like. In other words, providing the staircase 400 in FIG. 2b improves the capacity of the vehicle, and/or improves ergonomics of the seating 300 for passengers.

In addition, because the effective duct produced as a result of the open space of the staircase 400 between the lower and upper decks 110, 120 is reduced, this can assist with maintaining or controlling environmental conditions (e.g. heating and/or cooling) at each deck 110, 120. In other words, each deck 110, 120 can, from a heating and/or cooling perspective, be better isolated from one another. As will be appreciated, in some cases, for example when the vehicle 100 does not have a roof (e.g. a so-called open-top vehicle), it may be helpful to control the heating and/or cooling of the each deck 110, 120 independently.

Figure 6:
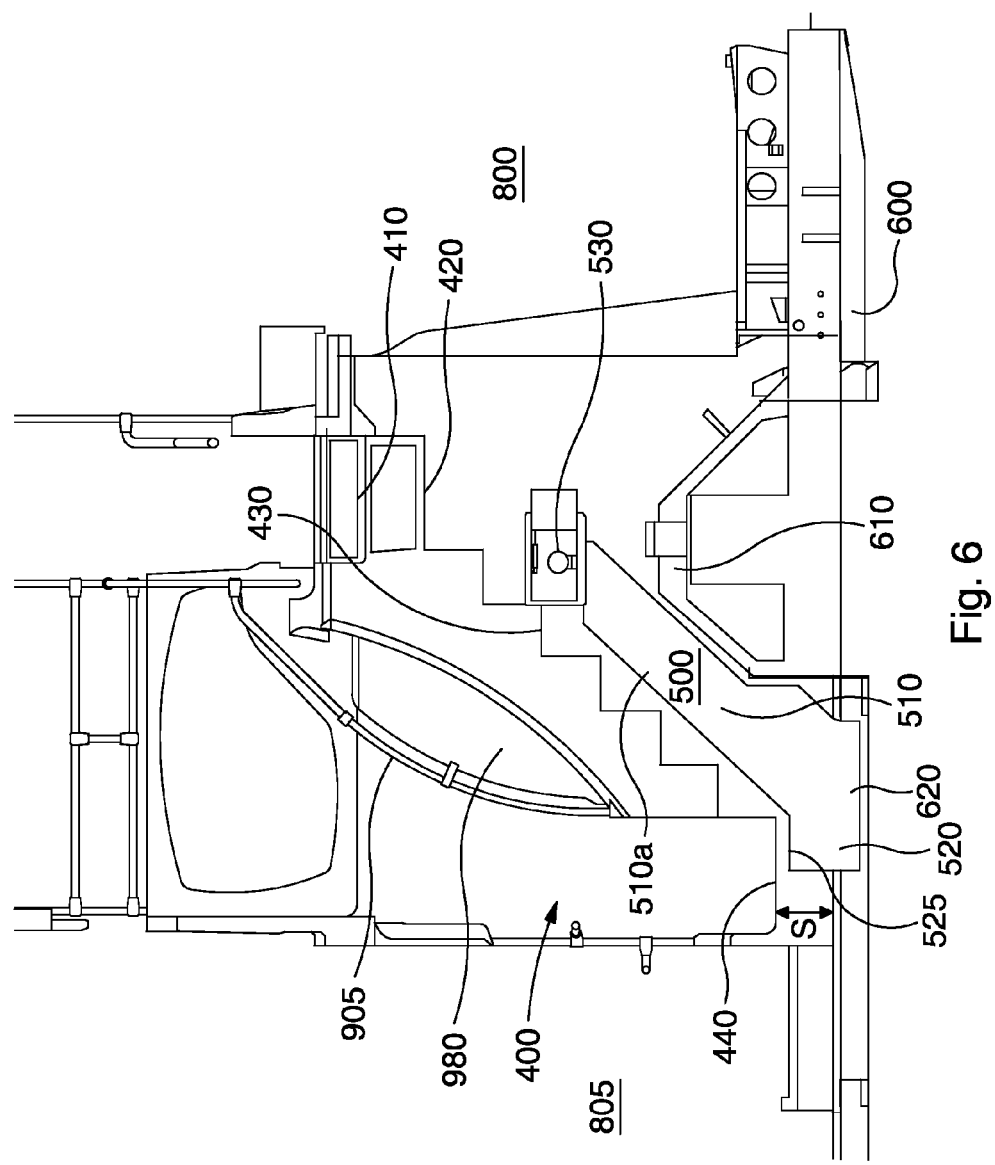
FIG. 6 shows a side view of the staircase of FIG. 2b comprised with a fuel tank.

Consider now FIG. 6, which shows a side view of the staircase 400 shown in FIG. 2b. As is shown, the recess 900 formed between the gangway 310, and in particular the lower deck 110 gangway, and the secondary stair portion 430, is partially occluded with a partition 980. Of course, in some examples, the partition 980 may not be provided in order for the recess 900 to be open, and so provide a sense of space within the vehicle 100. However, when occluded or partially occluded, the effective ducting between the lower deck 110 and the upper deck 120 can be reduced, improving further the thermal isolation of each deck.

Here, the vehicle comprises a fuel tank 500 (e.g. a tank for gasoline, hydrogen, liquid petroleum gas, etc.). The tank 500 is configured below the staircase 400, and essentially between, or substantially between, the staircase 400 and a chassis 600 of the vehicle 100. Here, the tank is provided between staircase 400 and a wheel arch 610 of the vehicle 100.

The tank 500 comprises a body portion 510 and a base portion 520. The body portion 510 extends in a complementary, or corresponding, manner with respect to the secondary stair portion 430 of the staircase 400. Here, the body portion 510 can be considered to extend obliquely with respect to the vehicle 100. In other words, the body portion may be considered to extend substantially parallel to the secondary stair portion 430. The body portion 510 has an outer profile region 510a that extends in a complementary manner with respect to the secondary stair portion 430.

Here, the base portion 520 extends in a complementary or corresponding manner with some or all of the lower intermediate landing 440. Here, an upper surface 525 of the base portion 520 is spaced from the lower intermediate landing 440. In this example, the upper surface may be considered to comprise an outer profile region that corresponds with the profile of the lower intermediate landing. Here, the base portion can be considered to extend laterally, as opposed to obliquely, with respect to the vehicle 100.

In this particular example, the tank 500 also extends into a recess 620 in the chassis 600, for example, into an aperture defined by supporting members of the chassis. The tank 500 further comprises a fuel inlet 530, positioned at an upper region of the body portion 510.

As will be appreciated, the inlet 530 can be positioned at a particular height on the vehicle 100 such that a user may readily place fuel into the tank 500. Providing the lower stair portion 450 effectively increases the space under the staircase and under the lower intermediate landing 440, such that the base portion 520 of the tank 500 can be commensurately increased in size, S, when compared to a similar tank that may be used with the staircase 200 of FIG. 2a. As such, the storage capacity of the tank 500 can be increased. Furthermore, the additional storage is provided at a lower section of the vehicle 100 and so does not unduly affect the centre of gravity of the vehicle 100 and/or require the modification of the position of the inlet 540 in order to provide such additional storage. As will be appreciated, addition fuel storage can be useful of vehicles such as three-axle vehicles. In this example, the storage of the tank 500 can be increased from around 250 liters to 350 liters by providing the lower stair portion 450 and secondary stair portion 430 in the manner described. It will be appreciated that, in some example, the staircase 400 of the vehicle 100 comprising the fuel tank 500 may not comprise the additional upper stair portion 410. However, nevertheless, in those examples, the same increased capacity of the tank 500 may be provided.

Furthermore, while in the above examples, the upper and lower stair portions 410, 450 have been described having one tread; in further examples, those stair portions may comprise more treads, such as two, three, four, or the like.

While the above examples describe embodiments in relation to staircases 200, 400 at the side region of a vehicle 100, in further examples, the staircase may be used at the rear of the vehicle. Similarly, while in the described examples, the upper stair portion 410 is described as extending perpendicular to the secondary stair portion 430. In further examples, the upper stair portion 410 may extend other than perpendicular but still be may considered to extend transverse to the secondary stair portion 430 and provide the change in direction or path. Similarly, the lower stair portion 450 may be considered as extending transverse to the secondary stair portion 430. A skilled reader will readily be able to implement such further embodiments.

It will be appreciated that any of the aforementioned staircases, steps, tanks, etc., may have other functions in addition to the mentioned functions and that these functions may be performed by the same staircases/steps/tanks.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A passenger service vehicle having an upper deck and a lower deck and a passenger staircase extending between the upper deck and the lower deck, the staircase positioned at the lower deck between a driver's area and a passenger area and positioned at the upper deck between a forward passenger area and a rearward passenger area, the staircase having at least an upper stair portion and a secondary stair portion, the upper stair portion being connected to the upper deck and comprising at least one tread, and being further connected to the secondary stair portion via an intermediate landing, wherein the upper deck extends for a length of the vehicle, and the secondary stair portion extends parallel with respect to the length of the upper deck, and the upper stair portion extends transversely with respect to the secondary stair portion, and wherein the staircase further comprises a lower stair portion connected to the lower deck, the lower stair portion comprising at least one tread and being connected to the secondary stair portion via a further intermediate landing, the lower stair portion extending transversely with respect to the secondary stair portion, such that the upper, secondary and lower stair portions that form the overall staircase are configured together in a U-shape.

2. A passenger service vehicle according to claim 1, wherein the upper stair portion extends perpendicularly with respect to the length of the upper deck and perpendicularly with respect to the secondary stair portion.

3. A passenger service vehicle according to claim 1, wherein the upper stair portion comprises only one tread.

4. A passenger service vehicle according to claim 1, wherein the lower stair portion extends perpendicularly with respect to the secondary stair portion and perpendicularly with respect to the length of the lower deck.

5. A passenger service vehicle according to claim 1, wherein the lower stair portion comprises only one tread.

6. A passenger service vehicle according to claim 1, wherein the staircase is configured such that a recess is formed between the upper and lower stair portions and between the secondary stair portion and gangways of the vehicle.

7. A passenger service vehicle according to claim 6, wherein one or both of the upper stair portion and the lower stair portion does not extend into the upper and/or lower deck gangway.

8. A passenger service vehicle according to claim 1, wherein the secondary stair portion comprises a plurality of treads, each tread orientated so as to be parallel to the length of vehicle.

9. A passenger service vehicle according to claim 1, wherein each stair portion has the same or similar sized steps, and wherein the tread of each step is substantially rectangular.

10. A passenger service vehicle according to claim 1, wherein the or each intermediate landing is provided as a quarter landing, sized differently from the tread of the steps of each stair portions.

11. A passenger service vehicle according to claim 1, wherein the upper deck comprises a profiled interior roof having a gangway region positioned roughly above a gangway of the upper deck and side regions extending above some or all of the passenger seats on either side of the vehicle, and wherein the staircase and interior roof are configured in a complementary manner such that passenger space provided between the gangway of the upper deck and the gangway region of the roof is similar or the same as the passenger space provided between the upper stair portion and the side region of the roof at the staircase.

12. A passenger service vehicle according to claim 1, wherein the vehicle comprises a fuel tank configured substantially between the staircase and a chassis of the vehicle.

13. A passenger service vehicle according to claim 12, wherein the tank comprises a body portion extending in a complementary or corresponding oblique manner with respect to the secondary stair portion of the staircase, and a base portion extending in a complementary or corresponding lateral manner with some or all of the lower intermediate landing.

14. A passenger service vehicle according to claim 13, wherein the base portion extends into a recess in the chassis.

15. A passenger service vehicle according to claim 1, wherein the vehicle is a double-axle vehicle or triple-axle vehicle.

16. A passenger service vehicle having an upper deck and a lower deck and a passenger staircase extending between the upper deck and the lower deck, the staircase having at least a lower stair portion and a secondary stair portion, the lower stair portion being connected to the lower deck and comprising at least one tread and being further connected to the secondary stair portion via an intermediate landing, the lower stair portion extending transversely with respect to the secondary stair portion, and wherein the staircase further comprises an upper stair portion connected to the upper deck, the upper stair portion comprising at least one tread and being connected to the secondary stair portion via a further intermediate landing, the upper stair portion extending transversely with respect to the secondary stair portion, such that the upper, secondary and lower stair portions that form the overall staircase are configured together in a U-shape, and wherein the vehicle further comprises a fuel tank having a body portion configured to extend in a complementary or corresponding manner with respect to the secondary stair portion of the staircase, and a base portion configured to extend in a complementary or corresponding manner with some or all of the intermediate landing between the lower stair portion and secondary portion.

17. A method comprising:
   providing a passenger service vehicle having an upper deck and a lower deck,
   providing a staircase extending between the upper deck and the lower deck, the staircase positioned at the lower deck between a driver's area and a passenger area and positioned at the upper deck between a forward passenger area and a rearward passenger area, the staircase having at least an upper stair portion comprising at least one tread and a secondary stair portion;
   providing the upper stair portion at the upper deck, the upper stair portion being connected to the secondary stair portion via an intermediate landing and wherein the upper deck extends for a length of the vehicle, and the secondary stair portion extends parallel with respect to the length of the upper deck, and the upper stair portion extends transversely with respect to the secondary stair portion; and
   providing a lower stair portion connected to the lower deck, the lower stair portion comprising at least one tread and being connected to the secondary stair portion via a further intermediate landing, the lower stair portion extending transversely with respect to the secondary stair portion, such that the upper, secondary and lower stair portions forming the overall staircase are configured together in a U-shape.

* * * * *